(12) United States Patent
Herberger et al.

(10) Patent No.: US 9,424,627 B2
(45) Date of Patent: Aug. 23, 2016

(54) SYSTEM AND METHOD FOR HIGH-PERFORMANCE CLIENT-SIDE IN-BROWSER SCALING OF DIGITAL IMAGES

(71) Applicant: MAGIX AG, Berlin (DE)

(72) Inventors: Tilman Herberger, Dresden (DE); Titus Tost, Dresden (DE)

(73) Assignee: BELLEVUE INVESTMENTS GMBH & CO. KGAA (DE)

(*) Notice: Subject to any disclaimer, the term of this patent is extended or adjusted under 35 U.S.C. 154(b) by 0 days.

(21) Appl. No.: 14/827,947

(22) Filed: Aug. 17, 2015

(65) Prior Publication Data

US 2016/0048939 A1    Feb. 18, 2016

Related U.S. Application Data

(60) Provisional application No. 62/037,867, filed on Aug. 15, 2014.

(51) Int. Cl.
*G06T 1/00* (2006.01)
*G06T 3/40* (2006.01)

(52) U.S. Cl.
CPC .................................. *G06T 3/4092* (2013.01)

(58) Field of Classification Search
CPC .................... G06F 17/30265; G06F 17/30247; G06F 17/3025; G06F 17/30259; G06F 17/30256; G06F 17/30017; G06F 17/30011; G06K 19/06037; H04N 1/2175
See application file for complete search history.

(56) References Cited

U.S. PATENT DOCUMENTS

2015/0077326 A1* 3/2015 Kramer ................. G06F 3/0325
345/156

* cited by examiner

*Primary Examiner* — Duy M Dang
(74) *Attorney, Agent, or Firm* — Fellers, Snider, Blankenshi Bailey & Tippens, P.C.; Terry L. Watt

(57) ABSTRACT

According to a preferred aspect of the instant invention, there is provided a system and method for high-performance client-side in-browser scaling of digital images. The instant invention processes large digital images in a client-based web browser, prior to upload to a server. The system provides a tremendous decrease in time required for uploading of digital images for online use. The instant invention that is carried out on the client device is therewith decreasing processing time and bandwidth.

9 Claims, 3 Drawing Sheets

SYSTEM AND METHOD FOR HIGH-PERFORMANCE CLIENT-SIDE IN-BROWSER SCALING OF DIGITAL IMAGES

This application claims the benefit of U.S. Provisional Patent Application Ser. No. 62/037,867 filed on Aug. 15, 2014 and incorporates said provisional application by reference into this document as if fully set out at this point.

FIELD OF THE INVENTION

The present invention relates to the general subject matter of image processing and analyzing digital images in an online environment and, more specifically, to systems and methods for client-side downscaling of large photos and images, prior to upload to a server.

The digital multimedia landscape associated with digital photo/digital imaging subject matter has changed tremendously in the last couple of years. Digital images can be taken with mobile phones, tablets and digital cameras. The enhanced functionality of the mobile devices (phones and tablets) created an enhanced desire and opportunity to distribute the taken digital images to others over the Internet. Mobile phones are supplied with a number of applications that allow users to upload and share digital images within seconds after the images have been taken. Digital cameras however took a different direction as compared to mobile phones. For mobile phones the technical specifications of the taken digital photographs are not that important, better sensors and higher mega pixel values got a higher priority ultimately leading to larger file sizes regarding the digital images from these new digital cameras.

Additionally to the mentioned general sharing opportunity of digital images taken with mobile phones, mobile phones offer a multitude of different ways for users to share the digital images they took with their digital cameras. Multiple photo management applications provide individual cloud based storage solutions to store the digital images taken by the user, additionally a multitude of individual internet based photo storage solutions are available, allowing the user to upload digital images via the web browser to share these digital images with other users. Due to the evolution in digital cameras, leading to the mentioned higher pixel values and additionally also the more common use of different image formats the file sizes of digital images from digital cameras are getting larger and larger.

One common problem with online sharing is the process of uploading digital images to a server. Typically a low resolution image would be sufficient on a server (e.g., for use in social media, thumbnail directories, etc.), however generally the full size image is uploaded to the server, with the server processing the uploaded image and therewith providing the lower resolution versions of the digital image for further use. The process of uploading the full size digital image is however wasteful of both time and bandwidth, additionally to that the server-side processing of the digital images is taking up processing power of the server.

Thus, what is needed is a system and method for computer devices that provides an uploading scheme for digital images that is concerned with addressing both the time and bandwidth waste. The instant invention provides an improvement over the standard state of the art uploading process for digital images by introducing a high performance client side in-browser scaling approach. The instant invention provides a solution that is efficient and that is furthermore constantly informing the user about the progress, wherein apart from that information no further input or information from the user is necessary.

Heretofore, as is well known in the media editing industry, there has been a need for an invention to address and solve the above-described problems. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for high performance client-side in browser scaling and uploading of digital images. According to one embodiment, there is provided an automatic and autonomous process that is a clear improvement over the known state of the art to upload digital images more quickly for online use. In this embodiment, the method constantly provides information about the current stage of the uploading process to the user. The instant invention is primarily concerned with the creation of a smaller version of a larger image on the client side to improve and support the upload process of digital images for a user. The process of the instant invention significantly reduces the time and effort needed to provide a usable version of the digital image on a server, which is especially important and helpful for slower Internet connections or internet connections with a bandwidth limit.

In one embodiment, at least five individual downsizing steps will be carried out on the client side prior to uploading the entirety of the downsized image to a server. An initial step will be to load the original image data into memory associated with a computing device for further processing. In the next step a canvas object with the same size as the desired smaller image, i.e., a placeholder for the destination/downsized image, will be created. Next at least one smaller sized square canvas will be created. This created canvas will be used to process the image data in patches, preferably one patch at a time. In a next preferred step a selected patch of the original image, which will typically be the same size as the square canvas, will be scaled down by the amount required to scale the original image to the destination image size. In a next preferred step the down-scaled patch will be copied to the appropriate part of the destination canvas. An embodiment then will then repeat this process, scaling down the individual patches of the original image and copying the scaled down patches to the corresponding part of the destination canvas, until the entire original image has been processed.

Continuing with the present example, each scaling step will be performed with five successively smaller scaling operations for each patch. The successive stepwise scaling provides a better image quality in the end than doing a single large scaling operation. Additionally, the process of separating the original image into patches and processing these patches individually provides two principal benefits. First, the memory requirements of the process on the client side are significantly reduced, because only a single smaller copy of the large original image is stored in memory—which might be particularly useful or instances where an embodiment is implemented on mobile devices. Second, patch-wise processing of the image allows the progress of the whole process to easily be tracked and, for example, communicated to the user. In some embodiments this will provide information that can be evaluated and provided to the user, with the information being extracted and provided for each patch process and each step of the scaling process. The final image will be pieced together from each of the individually processed patches and to avoid patch edges from appearing in the final destination image, in some embodiments each patch will be padded with a 15 pixel margin around its perimeter to mitigate the edge effects that might otherwise distort the final product. Of course, those of ordinary skill in the art will recognize that such padding might be present or not depending on the particular application. That being said, some embodiments use about a 5 to 20 pixel margin.

One focus of various embodiments is integration with mobile computing devices (such as phones, tablets, etc.). In some embodiments, the procedures are implemented in a way that recognizes the memory capacities/limitations, CPU power, network bandwidth, etc., of these devices to make sure that a useful scaled image will be created for upload to the server. In one embodiment, the instant invention includes checks to make sure that the processed canvas patches have not been truncated, to counter problems with mobile devices that are unable to handle situations where the memory is low or used up. Additionally, in some cases the inherent functionality of a plurality mobile devices or browser software installed on these devices might include native image scaling capabilities, but such may tend to degrade the quality of the image. An embodiment provides functions that replace such pre-scaling functions and ensures the quality of the scaling process.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DESCRIPTION OF THE PREFERRED EMBODIMENTS

Figure 1:
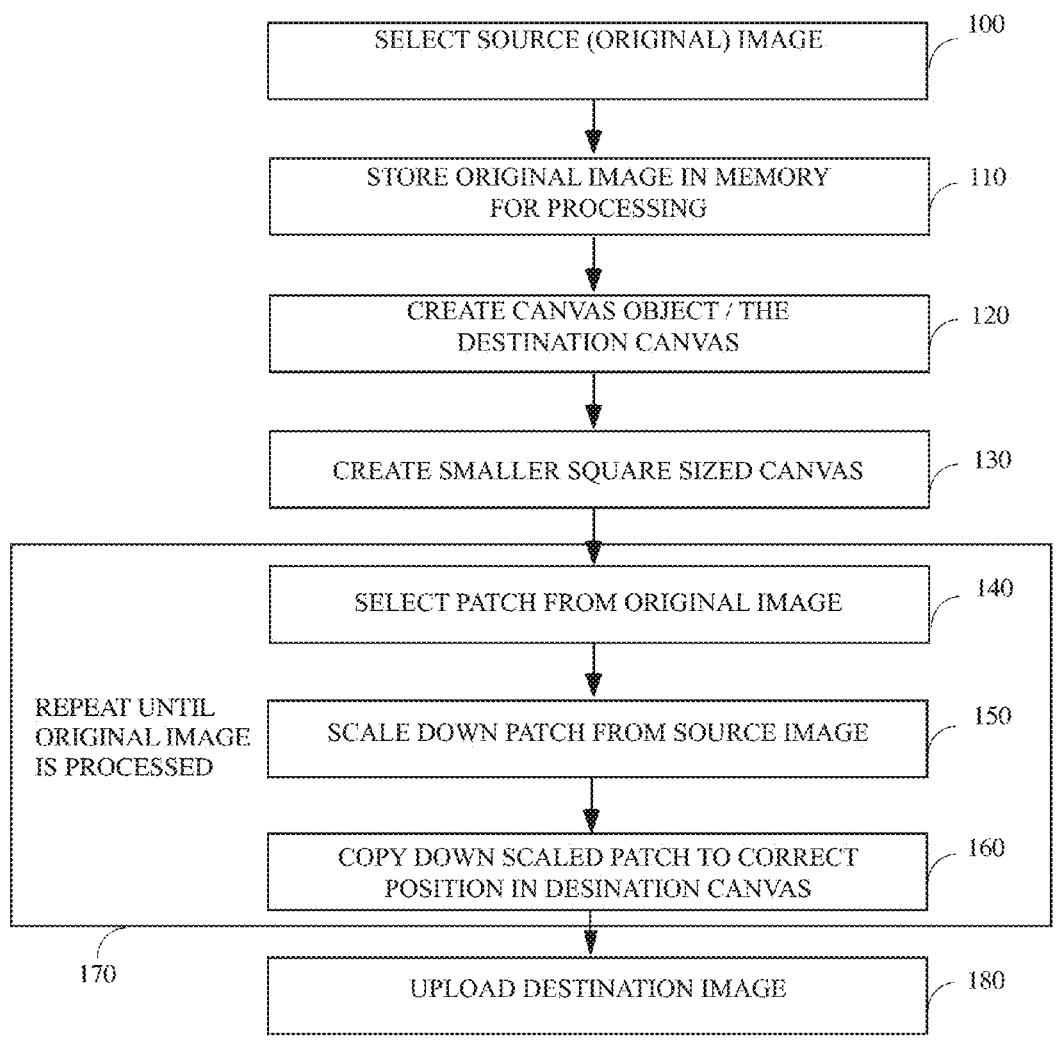
FIG. 1 illustrates the steps of the in-browser scaling of the instant invention.

Referring now to the drawings, wherein like reference numerals indicate the same parts throughout the several views, there is provided a preferred system and method for implementing high-performance client-side in-browser scaling of digital images.

An embodiment begins with the selection of an image 100 on a personal computer or a mobile computing device (e.g., a cell phone, tablet computer, etc.). The selected original image will then, in a second preferred step, be stored in the memory of the device for further processing 110. In a next preferred step a canvas object with the size of the desired smaller scaled image will be created—this smaller image will be referred to herein as the destination image, or destination canvas 120. In a next preferred step the instant invention will generate a square canvas, whose size is preferably 1k (i.e., 1024) pixels 130 on each side. This smaller canvas, or patch will be utilized to piecewise process the data of the original image, with each patch being processed one at a time by the instant invention, preferably until all the data of the original image is processed. Next and according to the present embodiment, the instant invention will select a section or patch from the original image the size of the smaller canvas for processing 140.

Continuing with the present embodiment, the selected patch of the original image will be scaled down by the amount required to scale the image to the size of the destination image 150. The down-scaled patch will then be copied to the appropriate section of the destination canvas 160. This number of steps—the selection of the patch from the original image, the scaling down of the patch from the original image and the copying of the scaled down patch to the appropriate section of the destination canvas—will be repeated until the whole selected original image is processed and until the destination canvas is filled with processed patches 170. When all generated patches of the original image have been scaled down and copied to the destination canvas the generated destination image will be uploaded to the server 180 in a next preferred step.

Figure 2:
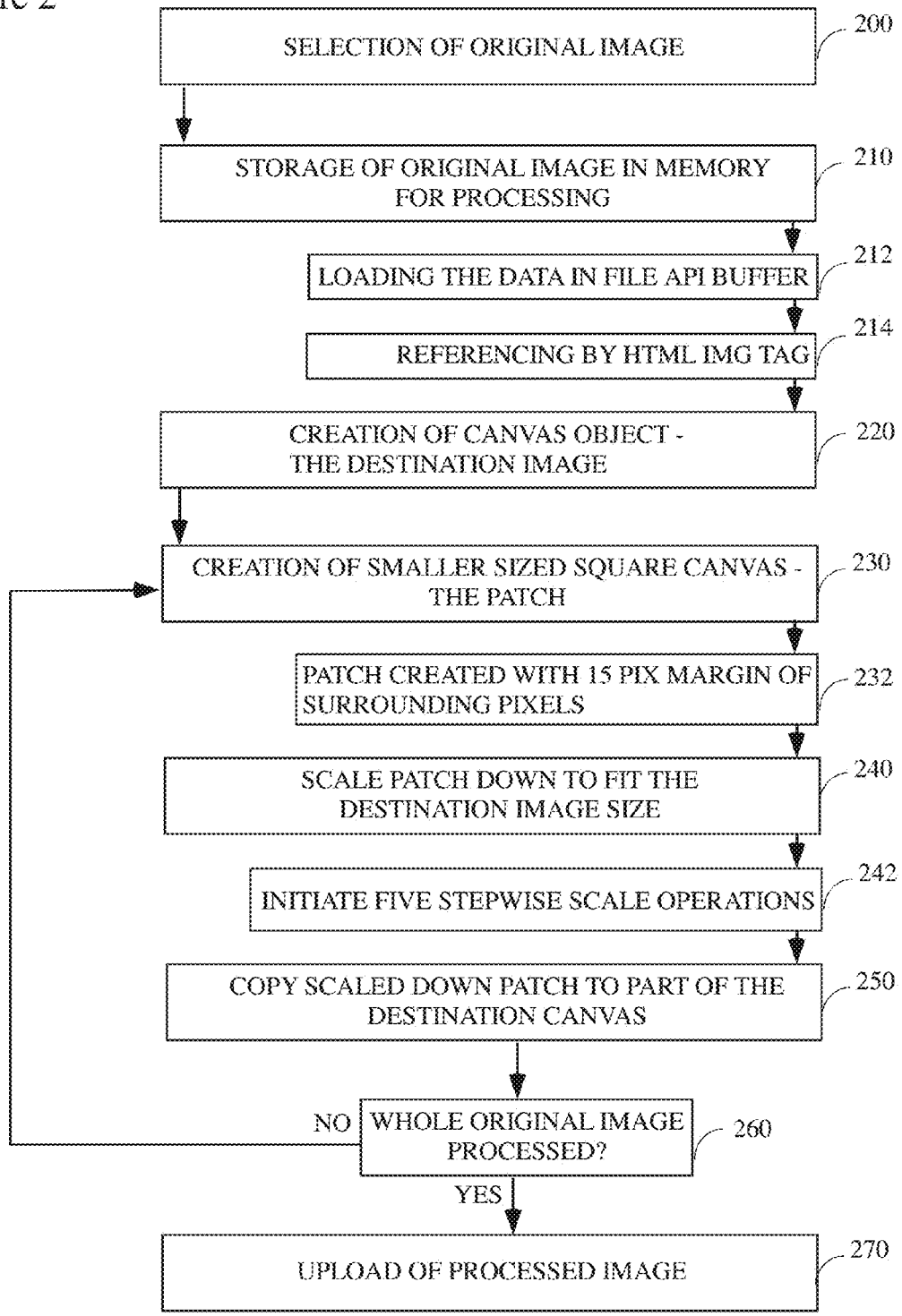
FIG. 2 illustrates a more detailed listing of the steps of the instant invention.

Turning next to FIG. 2, this figure contains a more detailed description of some steps associated with an embodiment. In a first preferred step an original image will be selected, preferably by a user who is sitting at a personal computer or using a mobile computing device 200. In a next preferred step the selected original image will be stored in the memory of the user's device for further processing 210. The storage will be carried out in this embodiment by loading the image data into a file API buffer 212 and then associating it with an html IMG tag 214 so that it can be loaded into the browser environment on the computer device. It is preferred that the program that is performing the down scaling is an Internet browser.

In a next preferred step a canvas object—for processing—will be created, i.e., the destination image 220. The canvas object will preferably and generally be smaller than the original image and its size will likely be selected to represent the scaling target size. Those of ordinary skill in the art will recognize that the "canvas" might only be a section of memory in which the destination image is stored.

In a next preferred step the instant invention will create another smaller sized square canvas—the patch 230, which will be used in separating the original image into a plurality of smaller sized patches. These patches will be processed and used as building blocks for the final scaled image. Again, the "patch" may be just a section of memory.

In order to minimize the possibility that edge effects due to the partitioning will appear in the final image, each patch will include a margin around the extracted pixels 232. In some instances this might be a 15 pixel margin, but those of ordinary skill in the art might choose a margin that is narrower or wider depending on the size of the patch, the size of the original image, etc.

In a further step in the present example, each patch will then be scaled down by the amount required to scale the original image size to the destination image size 240. The scaling step is actually performed in some embodiments with five successive stepwise smaller scaling operations 242. These five scaling operations will be executed sequentially to avoid degraded image quality in the browser. In some embodiments, nearest neighbor downsizing might be used. In other embodiments, bilinear or bicubic splines, etc., could be used.

After finishing the scaling process the down-scaled patch will be copied to the appropriate location in the destination canvas 250. In the next preferred step the instant invention will detect whether or not the entire original image has been processed 260. If it has been processed, the instant invention will upload the processed destination canvas to the server 270 for insertion into the final down-scaled image. If the question is not answered in the affirmative (i.e., the image has not been fully processed), an embodiment will select another patch \that will then be scaled down to the desired size, etc.

Figure 3:
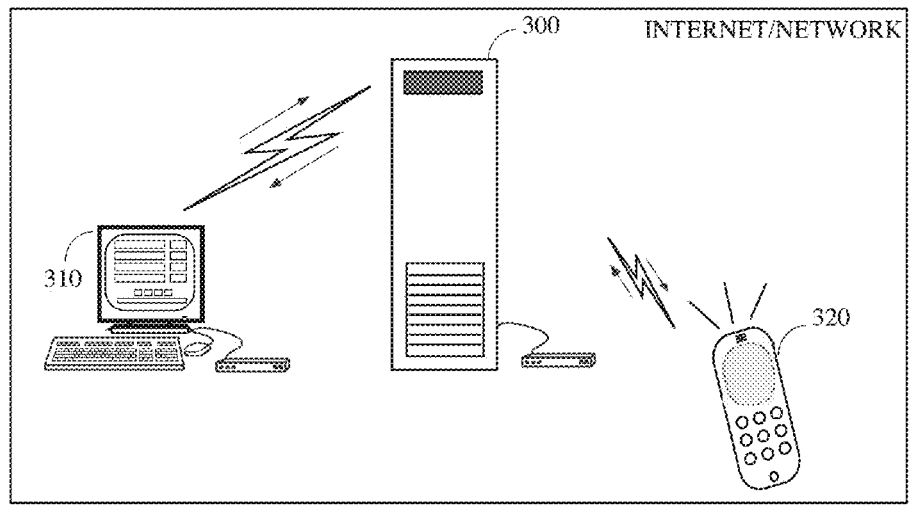
FIG. 3 illustrates a preferable working environment of the instant invention.

Turning next to FIG. 3, this figure illustrates an example depiction of the basic working environment. All participating devices are connected through some kind of network, preferably the Internet. A server computer 300 is a central point of the process and, in some embodiments, is responsible for storing the down scaled images after they have been uploaded from the client devices. The instant invention might be carried out on a personal computer 310, as well as on any mobile device capable of connecting to the Internet, whether it might be a cell phone/smart phone 320 or a tablet device. The client devices scale the images within the stored software, preferably the browser, which then uploads the processed images to the server for further presentation for example.

Figure 4:
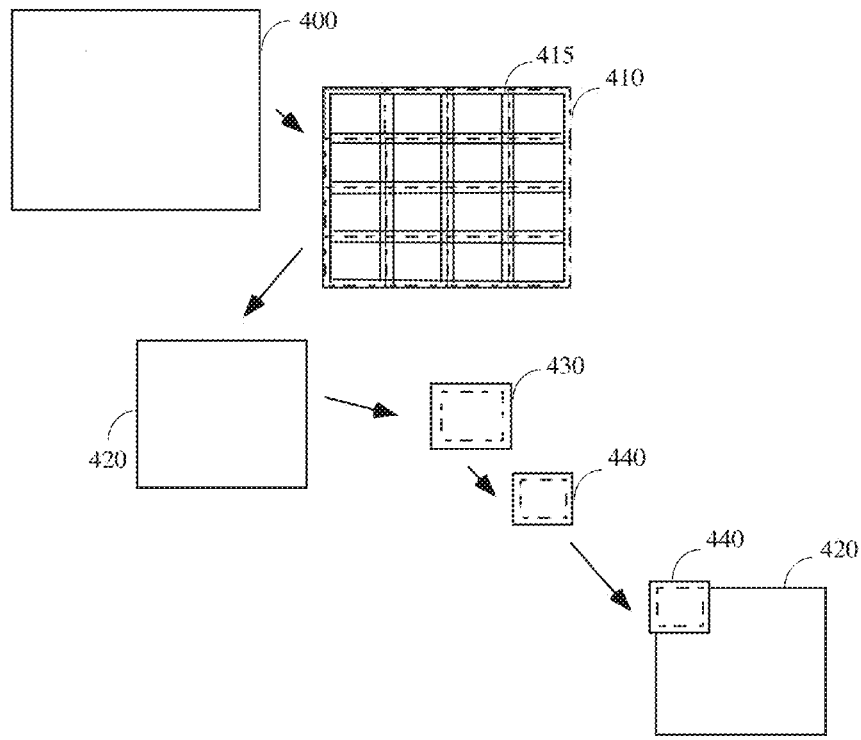
FIG. 4 depicts a schematic illustration of the steps of the instant invention.

Turning next to FIG. 4, this figure shows schematically the steps of an example of the instant invention. The original image 400 has been selected by the user for upload via the installed browser software on the client device which might be, e.g., a personal computer or mobile device, etc. The original image is then virtually—during processing—separated into a number of different square sized patches 410 that will be utilized during the scaling process. Due to the margin (15 pixels in this example) that is added to each individual patch, the calculated patches will overlap 415 at their margins. However, generally speaking, the patches will not otherwise overlap.

A destination canvas will be created 420 which will be sized to accommodate the smaller size of the down scaled original image, a size that is desired or required by the target site, e.g., the server. In some cases, the destination canvas will be sized by reference to a down scaling factor, e.g., if the down scaling factor is "2" the output canvas will be ½ the size in each direction of the input, which would result in a overall size decrease by a factor of 4. Other embodiments might specify the output image scale factor as a percentage of the size of the original (e.g., the output image might be 50% of the size of the input). Those of ordinary skill in the art will recognize that there are many other ways to characterize a reduction in image size. Thus, for purposes of the instant disclosure the term "scale factor" will be broadly construed to specify the relative size of the output image in terms of the input, no matter how that factor is presented.

In a next preferred step the instant invention will create the patches 430, one patch at a time, wherein the patches in their entirety represent the complete original image. In some embodiments, these patches will be all of the same size and scaled down, one after another, by the amount required to scale the original image to the desired destination image size. Each scaled down patch 440 will then be copied to the appropriate part of the destination canvas to finally generate the destination image.

In summary, the instant invention provides a substantial improvement for scaling large digital images in the web browser, prior to upload to a server. The process of the instant invention makes the process to upload digital images for online use more efficient, essentially helping processes such as for example inclusion of digital images in online photo albums. The instant invention selects a large image and scales it down very quickly, all on the client side, afterwards uploading the smaller scaled image to the server.

CONCLUSIONS

Although much of the discussion herein has been in terms of square patches, original images, downsized images, etc., it should be clear that was done for purposes of clarity in the exposition only and not out of an intent to limit the instant invention to only square images. In some embodiments a rectangular image will be converted to "square" by padding or cropping and, in other embodiments the rectangular image will be processed in that form. In the latter case, one option would be to create patches that have the same length to width ratio as the source image. Other embodiments might use combinations of different size square patches. As a specific example, a 2000 by 3000 pixel image might use one patch sized 2000 by 2000, and two others 1000 by 1000, each of which would then be reduced in size pursuant to the chosen scale factor with the three patch down-scalings being recombined to produce an image that has been scaled according to the selected scale factor.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted the ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purpose of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about, "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Still further, additional aspects of the instant invention may be found in one or more appendices attached hereto and/or filed herewith, the disclosures of which are incorporated herein by reference as if fully set out at this point.

Of course, many modifications and extensions could be made to the instant invention by those of ordinary skill in the art. For example in one preferred embodiment the instant invention will provide an automatic mode, which automatically processes a plurality of individually selected or designated original images and also uploads the processed and generated scaled down versions to an online server.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of client side in-browser scaling of digital images comprising the steps of:
    a. accessing an original digital image within said browser;
    b. selecting a down-scaling factor;
    c. determining an output size of said original digital image based on said scaling factor;
    d. creating a destination canvas at least as large as said output size of said original digital image;
    e. creating a canvas within said browser with a same size as said output size of said original digital image;
    f. within said browser separating the original digital image into a plurality of patches, each of said plurality of patches containing a portion of said original digital image, said plurality of patches taken together containing all of said original digital image;
    g. selecting one of said patches;
    h. scaling down said selected patch according to said scaling factor to a down-scaled patch;
    i. copying said down-scaled patch to a corresponding part of the destination canvas object;
    j. repeating steps of (f) through (i) until all of said plurality of patches have been processed
    k. combining said plurality of down-scaled patches, thereby forming a down-scaled version of said original image according to said down-scaling factor; and,
    l. transmitting said down-scaled version of said original image to a remote server.

2. A method according to claim 1, wherein step a. comprises the steps of:
    (a1) storing said original digital image in a file API buffer; and,
    (a2) referencing the original digital image with an IMG tag to load the original digital image into memory for further processing.

3. A method according to claim 1, wherein each of said patches has a size 1K pixels by 1K pixels.

4. A method according to claim 1, wherein each of said plurality of patches has a 15 pix margin.

5. A method according to claim 1, wherein step (h) comprises the steps of:
    (h1) successively implementing at least five stepwise down-scaling steps to scale down said selected patch according to said scale factor.

6. A method according to claim 5, wherein each of said at least five stepwise down-scaling steps successively reduce a size of said selected patch according to said scale factor.

7. A method according to claim 6, wherein a user is notified each time one of said at least five scaling steps is completed.

8. A method according to claim 1, wherein the method is performed out on a mobile computing device or on a personal computer.

9. A method according to claim 1, further comprising the step of:

(m) displaying on said remote server a representation of said transmitted down-scaled version of said original digital image.

\* \* \* \* \*